(12) United States Patent
Yao et al.

(10) Patent No.: US 12,438,450 B2
(45) Date of Patent: Oct. 7, 2025

(54) TWO-STAGE ELECTRICAL CONTROLLING SYSTEM AND ELECTRICAL APPARATUS

(71) Applicant: CONTEMPORARY AMPEREX TECHNOLOGY (HONG KONG) LIMITED, Hong Kong (CN)

(72) Inventors: Yuan Yao, Ningde (CN); Weichen He, Ningde (CN); Huaisen Zhang, Ningde (CN); Guiying Lin, Ningde (CN); Jinfeng Gao, Ningde (CN); Zhimin Dan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 123 days.

(21) Appl. No.: 17/866,806

(22) Filed: Jul. 18, 2022

(65) Prior Publication Data

US 2023/0144700 A1 May 11, 2023

Related U.S. Application Data

(63) Continuation of application No. PCT/CN2021/129887, filed on Nov. 10, 2021.

(51) Int. Cl.
*H02M 1/42* (2007.01)
*H02J 3/32* (2006.01)

(52) U.S. Cl.
CPC ......... *H02M 1/4241* (2013.01); *H02J 3/322* (2020.01); *H02M 1/4266* (2013.01)

(58) Field of Classification Search
CPC ............ H02M 1/0003; H02M 1/0006; H02M 1/0009; H02M 1/0012; H02M 1/0067;
(Continued)

(56) References Cited

U.S. PATENT DOCUMENTS

| 9,337,689 B2 | 5/2016 | Liu et al. |
| 2011/0298305 A1 | 12/2011 | Chisenga et al. |

(Continued)

FOREIGN PATENT DOCUMENTS

| CN | 104767414 A | 7/2015 |
| CN | 107846151 A | 3/2018 |

(Continued)

OTHER PUBLICATIONS

English translation of CN112428864. (Year: 2021).*

(Continued)

*Primary Examiner* — Thienvu V Tran
*Assistant Examiner* — Carlos O Rivera-Perez
(74) *Attorney, Agent, or Firm* — Ladas & Parry LLP (57) ABSTRACT

This application discloses an electrical system and an electrical apparatus. The electrical system includes: a first-stage conversion module including a plurality of first controllable switches; a second-stage conversion module including a plurality of second controllable switches; a first digital signal processor configured to control the first controllable switch; and a second digital signal processor configured to control the second controllable switch, where a first output crossbar switch of the first digital signal processor is configured to supply a first internal signal to a first output port, so that the second digital signal processor receives the first internal signal within a preset time through a second input port. The internal signal of the first digital signal processor can be enabled to be transmitted to the second digital signal processor within a relatively short time, thereby reducing a time interval for triggering a protection action between the two digital signal processors.

9 Claims, 7 Drawing Sheets

(58) Field of Classification Search
CPC .......... H02M 1/007; H02M 1/32; H02M 1/42; H02M 1/4208; H02M 1/4216; H02M 1/4233; H02M 1/4241; H02M 1/425; H02M 1/4258; H02M 1/4266; H02M 3/01; H02M 3/155; H02M 3/156; H02M 3/157; H02M 3/158; H02M 3/335; H02M 3/33569; H02M 3/33573; H02M 5/40; H02M 5/42; H02M 5/44; H02M 5/453; H02M 5/458; H02M 5/4585; H02M 7/217; H02M 7/219; H02M 7/515; H02M 7/521; H02M 7/523; H02M 7/525; H02M 7/527; H02M 7/529; H02J 3/28; H02J 3/32; H02J 3/322; B60L 53/24; Y02T 10/70; Y02T 10/7072
USPC ... 363/13, 15, 16, 17, 21.02, 34, 35, 37, 40, 363/44, 50–56.12, 65, 76, 78, 79; 323/266, 271–277, 282–285, 299, 351; 361/78, 79, 81, 86, 87, 88–92, 93.1–102
See application file for complete search history.

(56) References Cited

U.S. PATENT DOCUMENTS

| | | | |
|---|---|---|---|
| 2014/0077602 A1 | 3/2014 | Liu et al. | |
| 2015/0372471 A1* | 12/2015 | Sato | H02H 7/122 361/18 |
| 2017/0163144 A1* | 6/2017 | Boncato | H02M 1/32 |
| 2017/0279376 A1* | 9/2017 | Siri | H02M 7/5395 |

FOREIGN PATENT DOCUMENTS

| | | | |
|---|---|---|---|
| CN | 208271027 U | | 12/2018 |
| CN | 112428864 A | | 3/2021 |
| JP | H11187668 A | | 7/1997 |
| JP | 2004357408 A | | 12/2004 |
| JP | 2006304430 A | * | 11/2006 |
| JP | 2020167860 A | | 10/2020 |
| KR | 20190073142 A | | 6/2019 |

OTHER PUBLICATIONS

English translation of CN208271027. (Year: 2018).*
English translation of JP2006304430. (Year: 2006).*
International Search Report and Written Opinion for Application No. PCT/CN2021/129887, mailed on Jul. 27, 2022.
European search report and search opinion for EP application No. 21908091.8, mailed Apr. 17, 2023.
NXP white paper, "Smart Speed Technology Driving the Mobile Future", pp. 1-14, Retrieved from the Internet: URL: https://www.nxp.com/docs/en/white-paper/SMRTSPDMFWP.pdf [retrieved on Apr. 4, 2023].
First Office Action of EP application No. 21908091.8, dated Dec. 4, 2023.
First Office Action of JP application No. 2022-532014, dated Dec. 18, 2023.
Notice of Preliminary Rejection, KR application No. 10-2022-7017695, dated Jun. 25, 2024.
"Smart Speed Technology", Freescale Semiconductor, 2009 White paper (Apr. 30, 2009).

* cited by examiner

TWO-STAGE ELECTRICAL CONTROLLING SYSTEM AND ELECTRICAL APPARATUS

CROSS REFERENCE TO RELATED APPLICATION

This application is a continuation of International Patent Application No. PCT/CN2021/129887, filed on Nov. 10, 2021, which is incorporated by reference in its entirety.

TECHNICAL FIELD

This application relates to the field of power supplies, and in particular, to an electrical system and an electrical apparatus.

BACKGROUND

Electric energy is a very important energy source in modern society and industry, and it is widely used to drive various devices such as vehicles. In an actual operation process of an electrical apparatus, an electrical system is usually required to draw power from an external power source such as a public grid, and convert the power into electric energy (for example, a specific voltage or current) that can meet usage requirements of the electrical apparatus.

Therefore, an electrical system composed of a plurality of modules has been designed by people to meet requirements of supplying power to the electrical apparatus. However, during operation of such electrical system, incoordination between different modules results in a decrease in system reliability.

SUMMARY

In view of the foregoing problem, this application provides an electrical system and an electrical apparatus, which can resolve the problem of incoordination between different modules in an electrical system.

According to a first aspect, this application provides an electrical system. The electrical system includes: a first-stage conversion module, a second-stage conversion module coupled to the first-stage conversion module, a first digital signal processor configured to control a first controllable switch, and a second digital signal processor configured to control a second controllable switch. The first-stage conversion module includes a plurality of first controllable switches; the second-stage conversion module includes a plurality of second controllable switches; the first digital signal processor includes a first output crossbar switch and at least one first output port; and the second digital signal processor includes at least one second input port coupled to the first output port. The first output crossbar switch is configured to supply a first internal signal to the first output port, so that the second digital signal processor receives the first internal signal within a preset time. The first internal signal is a fault signal generated in the first digital signal processor and used to trigger the first digital signal processor to turn off the first controllable switch and the second digital signal processor to turn off the second controllable switch.

In the technical solution of the embodiment of this application, a physical connection is established between the first digital signal processor for controlling the first-stage conversion module and the second digital signal processor for controlling the second-stage conversion module. An internal signal in the first digital signal processor may be transmitted to the second digital signal processor within a relatively short time by using an output crossbar switch, thereby effectively reducing a time interval for triggering a protection action between the two digital signal processors. Therefore, the second controllable switch of the second-stage conversion module can quickly follow the action of the first controllable switch of the first-stage conversion module.

In some embodiments, the second digital signal processor further includes a second output crossbar switch and at least one second output port; and the first digital signal processor further includes at least one first input port coupled to the second output port. The second output crossbar switch is configured to supply a second internal signal to the second output port, so that the first digital signal processor receives the second internal signal within a preset time. The second internal signal is a fault signal generated in the second digital signal processor and is used to trigger the first digital signal processor to turn off the first controllable switch and the second digital signal processor to turn off the second controllable switch.

In the technical solution of the embodiment of this application, a way for the second digital signal processor to transmit fault information to the first digital signal processor is added, so that the second digital signal processor may also allow its internal signal to be transmitted to the first digital signal processor in a very short time by using an output crossbar switch inside the second digital signal processor.

In some embodiments, the first digital signal processor further includes: a first comparator unit configured to detect a voltage signal or current signal in the first-stage conversion module in real time; and a first switch control unit configured to control the first controllable switch. The first comparator unit is configured to: when the voltage signal or current signal is abnormal, generate the first internal signal. The first switch control unit is configured to: in response to the first internal signal, turn off the first controllable switch. The first digital signal processor in the embodiment of this application may detect the voltage signal or current signal through an internally disposed comparator unit and then generate a corresponding fault signal, thus allowing a switch control unit to turn off a controllable switch in time.

In some embodiments, the second digital signal processor further includes: a second comparator unit configured to detect a voltage signal or current signal in the first-stage conversion module in real time, and a second switch control unit configured to control the second controllable switch. The second comparator unit is configured to: when the voltage signal or current signal is abnormal, generate the second internal signal. The second switch control unit is configured to: in response to the second internal signal, turn off the second controllable switch. Based on such a design, a comparator unit inside the second digital signal processor may also detect the voltage signal or current signal and then generate a second internal fault signal, thus allowing the switch control unit to turn off the controllable switch in time.

In some embodiments, the electrical system further includes an isolation module for electrical isolation. The first output port of the first digital signal processor is coupled to the second input port of the second digital signal processor via the isolation module. The second output port of the second digital signal processor is coupled to the first input interface of the first digital signal processor via the isolation module. In the embodiments of this application, an isolation module for implementing electrical isolation is disposed between the two digital signal processors, to avoid mutual interference between the first stage and the second stage.

In some embodiments, the electrical system further includes: a sampling circuit coupled to a connection of the first-stage conversion module and the second-stage conversion module, and a comparison circuit coupled to the sampling circuit. The sampling circuit is configured to collect an electrical signal at the connection; and the comparison circuit is configured to: when the electrical signal is abnormal, provide a third signal for the second digital signal processor. The second digital signal processor is further configured to: in response to the third signal, turn off the second controllable switch. In the embodiment of this application, in addition to a physical channel established by the output crossbar switch, a redundant path based on the sampling circuit and the comparison circuit is also designed between the two digital signal processors, thereby ensuring that the second-stage conversion module can quickly follow the action of the first-stage conversion module.

In some embodiments, the sampling circuit includes: a first comparator, a first resistor, a second resistor, a third resistor, a fourth resistor, and a first capacitor. One terminal of the first resistor is connected to a high-level terminal of a target node, the other terminal of the first resistor is connected to one terminal of the second resistor to form a first connection node. The other terminal of the second resistor is grounded, and the first connection node is connected to a first input terminal of the first comparator. One terminal of the third resistor is connected to a low-level terminal of the target node, and the other terminal of the third resistor is connected to a second input terminal of the first comparator. One terminal of the fourth resistor is connected to the second input terminal of the first comparator, and the other terminal of the fourth resistor is connected to an output terminal of the first comparator, to form a negative feedback path. One terminal of the first capacitor is connected to the second input terminal of the first comparator, and the other terminal of the first capacitor is connected to the output terminal of the first comparator. The output terminal of the first comparator is further coupled to the comparison circuit, to form an output terminal of the sampling circuit for providing a voltage signal that is proportional to a voltage at the connection. In such a design, a capacitor with a suitable resistance value and a capacitor with a suitable capacitance value are provided, so that the sampling circuit may stably output a voltage analog signal with a target amplification ratio at the output terminal.

In some embodiments, the comparison circuit includes a reference voltage source for providing a reference voltage and a second comparator. A first input terminal of the second comparator is coupled to an output terminal of the voltage sampling circuit, and a second input terminal of the second comparator is coupled to the reference voltage source. An output terminal of the second comparator is connected to the second digital signal processor, so that the output terminal of the second comparator is configured to: in response to a voltage of the target node being lower than the reference voltage, output the third signal to the second digital signal processor. In such a design, a comparison circuit is implemented based on an active comparator, and a corresponding high level or low level may be output at the output terminal when the level between the two input ends changes, so that the second digital signal processor can quickly turn off the second controllable switch accordingly.

In some embodiments, the comparison circuit further includes a fifth resistor, a sixth resistor, and a seventh resistor. One terminal of the fifth resistor is connected to the reference voltage source, the other terminal of the fifth resistor is connected to one terminal of the seventh resistor to form a first connection node. The other terminal of the seventh resistor is grounded, and the first connection node is connected to a second input terminal of the second comparator. One terminal of the sixth resistor is connected to an output terminal of the voltage sampling circuit, and the other terminal of the sixth resistor is connected to the first input terminal of the second comparator. The embodiments of this application construct a complete comparison circuit by providing a capacitor with a suitable resistance value and a capacitor with a suitable capacitance value, which can work normally in actual use.

According to a second aspect, this application provides an electrical apparatus. The electrical apparatus includes the electrical system described above and a load coupled to the electrical system. In operation, the electrical system is configured to draw and convert external power to supply power to the load.

The foregoing description is only an overview of the technical solution of this application, in order to be able to understand the technical means of this application more clearly, the technical solution may be implemented according to the content of the specification. Moreover, in order to make the foregoing and other purposes, features, and advantages of this application more obvious and easy to understand, the specific implementations of this application are described below.

BRIEF DESCRIPTION OF DRAWINGS

With reference to detailed descriptions in preferable implementations in the following descriptions, various other advantages and benefits become clear to persons of ordinary skill in the art. The accompanying drawings are only used to show the preferable implementations, and are not considered as limitations to this application. In addition, in all of the accompanying drawings, a same reference numeral is used for representing a same component. In the accompanying drawings.

DETAILED DESCRIPTION

The following describes in detail embodiments in technical solutions of this application with reference to the accompanying drawings. The following embodiments are only used to describe the technical solutions of this application more clearly, and are therefore only used as examples, and cannot be used to limit the protection scope of this application.

Unless otherwise defined, all technical and scientific terms used in this specification have the same meaning as commonly understood by persons skilled in the art of this application. The terms used in this specification are only for the purpose of describing specific embodiments, and are not intended to limit this application. The terms "include" and "comprise" and any variation thereof mentioned in this specification, the claims, and the foregoing descriptions of the accompanying drawings of this application are intended to cover a non-exclusive inclusion.

In the descriptions of the embodiments of this application, the technical terms "first", "second", and the like are only used to distinguish between different objects and shall not be understood as indicating or implying relative importance, or implicitly indicating a quantity and a particular sequence or a major and minor relationship of the indicated technical features. In the descriptions of the embodiments of this application, unless expressly specified and defined otherwise, the meaning of "a plurality of" means two or more.

"An embodiment" mentioned in this specification means that particular features, structures, or characteristics described with reference to the embodiments may be included in at least one embodiment of this application. The presence of the phrase in various places in this specification is not necessarily referring to a same embodiment nor a separate or alternative embodiment that is mutually exclusive of other embodiments. It is explicitly and implicitly understood by those skilled in the art that the embodiments described in this specification may be combined with other embodiments.

In the descriptions of the embodiments of this application, the term "and/or" is only an association relationship that describes associated objects, and represents that there may be three relationships. For example, A and/or B may represent three cases: only A exists, both A and B exist, and only B exists. In addition, the character "/" in this specification generally indicates an "or" relationship between the associated objects.

In the descriptions of the embodiments of this application, the technical term "a plurality of" refers to two or more (including two). Similarly, "a plurality of groups" refers to two or more groups (including two groups), and "a plurality of pieces" refers to two or more pieces (including two pieces).

In the descriptions of the embodiments of this application, orientations or position relationships indicated by the technical terms "central" "longitudinal", "lateral", "length", "width", "thickness", "upper", "lower", "front", "rear", "left", "right", "vertical", "horizontal", "top", "bottom", "inner", "outer", "clockwise", "anticlockwise", "axial", "radial", "circumferential", and the like are orientations or position relationships based on the accompanying drawings and are only intended to facilitate the descriptions of the embodiments of this application and simplify the descriptions, rather than indicating or implying that the referred apparatus or element must have a particular orientation or be constructed and operated in a particular orientation. Therefore, these terms should not be interpreted as limiting this application.

In the descriptions of the embodiments of this application, unless expressly specified and defined otherwise, the technical terms "mounted", "interconnected", "connected", and "fixed" should be understood in a broad sense. For example, "connection" may be a fixed connection, a detachable connection, or an integral connection; or may be a mechanical connection, or an electrical connection; or may be a direct connection or an indirect connection by means of an intermediate medium; or may be an internal communication or an interactive relationship between two elements. For persons of ordinary skill in the art, specific meanings of the foregoing terms in the embodiments of this application may be understood based on specific situations.

Currently, an electrical system composed of a plurality of different conversion modules has been widely used for high-efficiency power conversion. These different modules are usually controlled by different controllers (such as digital signal processors).

The applicant has noticed that controllers of different modules usually rely on data communication manners such as CAN bus to implement mutual information exchange. There is always a specific latency in an information transfer process of these conventional data communication manners. For example, a communication latency of the CAN bus is mainly affected by a baud rate and a bus load ratio, which is usually more than 100 us.

Such a latency reduces operation reliability of the electrical system in specific scenarios such as protection triggering. The following uses a switching power supply system using a power factor correction (PFC) circuit cascaded with a resonant (LLC) circuit shown in FIG. 1 as an example to describe in detail an impact of a communication time between controllers of different modules.

Figure 1:
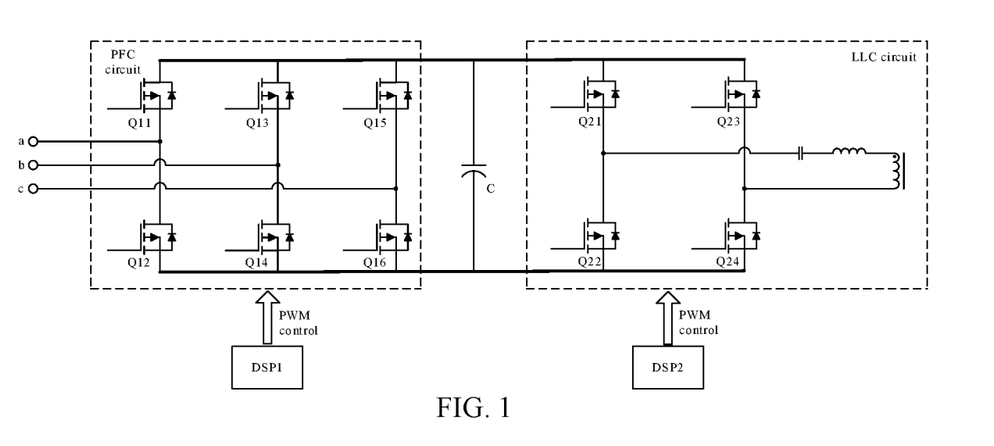
FIG. 1 is a schematic structural diagram of a typical electrical system in which a PFC circuit is cascaded with an LLC circuit.

Referring to FIG. 1, the switching power supply system includes two different modules: a PFC circuit and an LLC circuit. The PFC circuit is connected to a power grid to draw power. The LLC circuit (the primary side part of a transformer of the LLC circuit shown in FIG. 1 is merely used as an example) is configured to output a target voltage or current required by a load.

The PFC circuit includes six first controllable switching transistors, which are respectively represented by Q11, Q12, Q13, Q14, Q15, and Q16 in FIG. 1. The primary side part of the LLC circuit includes four second controllable switching transistors, which are respectively represented by Q21, Q22, Q23, and Q24 in FIG. 1. A first digital signal processor (DSP) DSP1 and a second digital signal processor DSP2 respectively control turn-on and turn-off of switching transistors of the PFC circuit and the LLC circuit, respectively.

In an actual operation process, when operation of the PFC circuit in FIG. 1 is abnormal, the first digital signal processor DSP1 is triggered to perform a protection action to stop the operation of the PFC circuit. Due to a communication latency between the two digital signal processors DSP1 and DSP2, within a time period of the communication latency, the second digital signal processor DSP2 is not triggered to perform a protection action, and the LLC circuit is still in a working state.

In this case, the PFC circuit has stopped operating, and cannot continue to maintain a voltage of a bus capacitor C at a connection of the PFC circuit and the LLC circuit. However, the LLC circuit in the working state is used as a load of the PFC circuit, causing a voltage across two terminals of the bus capacitor C to be reduced quickly.

Once the voltage of the bus capacitor C is lower than a peak voltage of the power grid, the voltage of the power grid is directly used to charge the bus capacitor C1 through a body diode of a switching transistor in the PFC circuit, which damages the switching transistor in the PFC circuit within a very short time.

For example, the peak voltage Uab in the power grid is approximately 537 V. Once the voltage across the two terminals of the bus capacitor is excessively low, the voltage Uab of the power grid may be used to charge the bus capacitor C through the first controllable switching transistors Q11 and Q14. In this case, the first controllable switching transistors Q11 and Q14 are in a short-circuit state and may be damaged within a very short time.

To resolve a problem of device damage caused by a too long communication latency between different modules, the applicant found through researches that, a proper hardware circuit and software configuration are added, so that a time interval for triggering a protection action between the first digital signal processor DSP1 of the first-stage conversion module and the second digital signal processor DSP2 of the second-stage conversion module is shortened as far as possible to be lower than a specific time threshold (for example, not more than 10 us), a case of device damage caused by non-synchronous working states of the first-stage conversion module and the second-stage conversion module may be well avoided.

A manner of shortening the time interval may be establishing a data interaction channel between the two digital signal processors based on an output crossbar switch, so that the first digital signal processor DSP1 can quickly provide information for the second digital signal processor DSP2.

The electrical system disclosed in the embodiments of this application may be used in, but not limited to, electrical apparatuses such as vehicles, ships, or aircrafts. It may be used as a power supply system, draw external power (for example, from the power grid), and convert the external power into a working voltage or working current (for example, a direct current with a constant voltage) required by the electrical apparatus.

Figure 2:
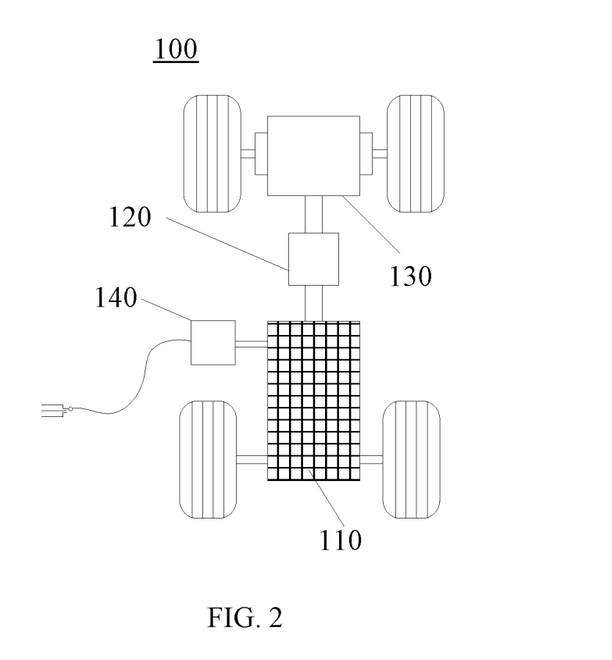
FIG. 2 is a schematic structural diagram of a vehicle according to some embodiments of this application.

For ease of description, an example in which an electrical apparatus according to an embodiment of this application is a vehicle 100 is used in the following embodiments. FIG. 2 is a schematic structural diagram of the vehicle 100 according to some embodiments of this application.

The vehicle 100 may be a fuel vehicle, a gas vehicle, or a new energy vehicle, and the new energy vehicle may be a pure electric vehicle, a hybrid electric vehicle, an extended-range vehicle, or the like. A battery 110 is disposed in the vehicle 100, and the battery 110 may be disposed at the bottom, the head, or the tail of the vehicle 100. The battery 110 may be used to supply power to the vehicle 100, for example, the battery 110 may be used as an operating power supply of the vehicle 100. The vehicle 100 may further include a controller 120, a motor 130, and an electrical system 140 provided in an embodiment of this application.

The controller 120 is configured to control the battery 110 to supply power to the motor 130, for example, configured for operating power requirements of the vehicle 100 during start-up, navigation, and driving. In some embodiments of this application, the battery 110 may not only be used as an operating power supply of the vehicle 100, and may also be used as a driving power supply of the vehicle 100, to replace or partially replace fuel oil or natural gas to provide driving power for the vehicle 100.

The electrical system 140 may be a car charger for charging the battery 110. It may use a topology form of cascading PFC with LLC. The PFC circuit in the first stage is connected to the power grid, and the LLC circuit in the second stage outputs a direct current at an output terminal. The PFC circuit and the LLC circuit may be controlled through two digital signal processors respectively in the form of PWM control, so that the car charger can draw power from the power grid and convert the power into a direct current with a target voltage or current to charge the battery 110.

Figure 3:
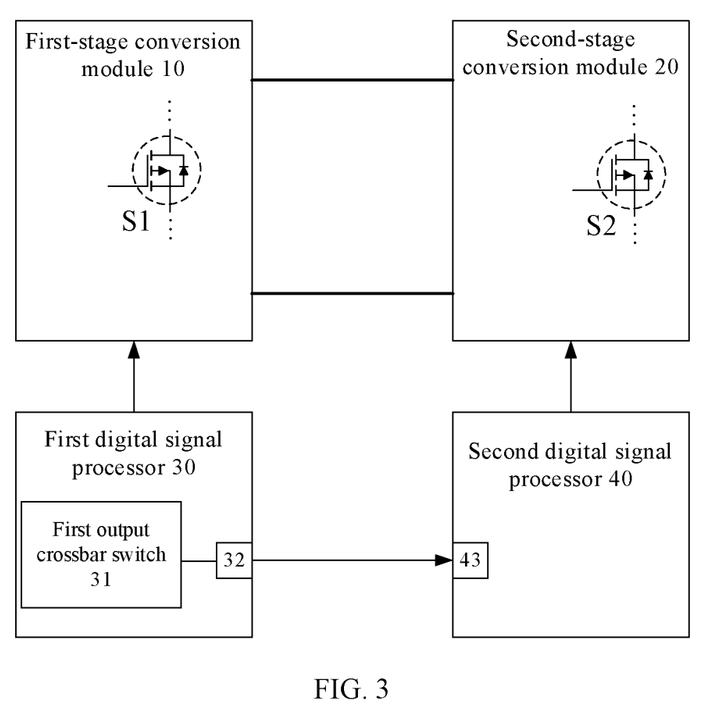
FIG. 3 is a schematic structural diagram of an electrical system according to some embodiments of this application.

According to some embodiments of this application, FIG. 3 is a schematic structural diagram of an electrical system in some embodiments of this application. Referring to FIG. 3, the electrical system includes: a first-stage conversion module 10, a second-stage conversion module 20, a first digital signal processor 30, and a second digital signal processor 40.

The first-stage conversion module 10 includes a plurality of first controllable switches S1. The turn-on and turn-off of these first controllable switches S1 are controlled by the first digital signal processor 30 in order according to a set control program. The second-stage conversion module 20 also includes a plurality of second controllable switches S2. The turn-on and turn-off of these second controllable switches S2 are controlled by the second digital signal processor 40 in order according to a set control program.

The "first-stage conversion module" and the "second-stage conversion module" specifically used in the electrical system may be determined according to actual requirements, and are not limited in this application. For example, the electrical system may be a conversion circuit in a topology form of cascading PFC with LLC, a conversion circuit in a topology form of cascading a PFC circuit with a phase-shift full bridge (PSFB) circuit, a conversion circuit in a topology form of cascading an LLC circuit with a buck-boost circuit, or a conversion circuit in a topology form of cascading a phase-shift full bridge (PSFB) circuit with a buck-boost circuit.

The "first controllable switch" and the "second controllable switch" may be any type of electronic devices, for example, metal-oxide-silicon (MOS) transistors, that can switch between turn-on and turn-off states. Specific implementations of the electronic devices may be determined according to actual requirements, and are not limited in this application.

Therefore, FIG. 3 only shows an example in which the first-stage conversion module 10 includes a first controllable switch S1, and the second-stage conversion module 20 includes a second controllable switch S2, but does not show a specific connection manner and quantity of first controllable switches S1 and second controllable switches S2.

Still referring to FIG. 3, the first digital signal processor 30 may include a first output crossbar switch 31 and at least one first output port 32. Correspondingly, the second digital signal processor 40 includes at least one second input port 43 coupled to the first output port 32.

In operation, the first digital signal processor 30 controls the first controllable switch S1 of the first-stage conversion module 10 to be turned on or off in order. When an abnormality is detected, the first digital signal processor 30 generates a first internal signal to trigger the first digital signal processor 30 to perform a protection action to turn off the first controllable switch S1, so as to stop the operation of the first-stage conversion module 10.

The first internal signal generated in the first digital signal processor 30 may further be forwarded, through the first output crossbar switch 31, to the first output port 32 for output. The output first internal signal is quickly transmitted to the second digital signal processor 40 through the second input port 43 connected to the first output port 32. In this way, the second digital signal processor 40 may receive the first internal signal within a preset time, thereby triggering a protection action of turning off the second controllable switch S2, and stopping the operation of the second-stage conversion module.

The "first output crossbar switch" is a signal routing unit (for example, a component called an X-bar in the digital signal processor) located in the first digital signal processor 30. A signal in the first digital signal processor may be conveniently transmitted, according to pre-configured program instructions, to the first output port to be output.

One of the advantageous aspects of the electrical system provided in the embodiments of this application is that a fault signal transmission channel based on an output crossbar switch is established between the first digital signal processor for controlling the first-stage conversion module and the second digital signal processor for controlling the second-stage conversion module. Therefore, an internal signal in the first digital signal processor may be transmitted to the second digital signal processor within a relatively short time, thereby effectively reducing a time interval for triggering a protection action between the two digital signal processors.

Figure 4:
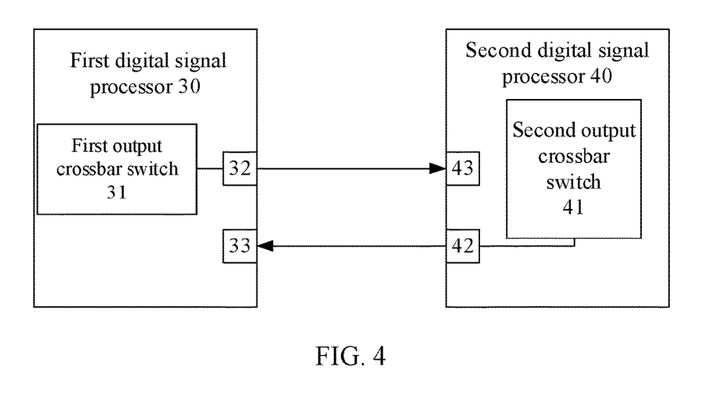
FIG. 4 is a schematic structural diagram of a digital signal processor according to some embodiments of this application.

According to some embodiments of this application, FIG. 4 is a schematic structural diagram of a digital signal processor in some embodiments of this application. Referring to FIG. 4, the second digital signal processor 40 may further include a second output crossbar switch 41 and at least one second output port 42. Correspondingly, the first digital signal processor 30 further includes at least one first input port 33.

The first input port 33 of the first digital signal processor 30 is coupled to the second output port 42 of the second digital signal processor 40.

The second output crossbar switch 41 is a signal routing unit (for example, a component called an X-bar in the digital signal processor) located in the second digital signal processor 40. A signal in the second digital signal processor may also be conveniently transmitted, according to pre-configured program instructions, to the second output port to be output.

In operation, the second digital signal processor 40 controls the operation of the second-stage conversion module 20 and detects whether the operation is abnormal. When the operation of the second-stage conversion module 20 is abnormal, the second digital signal processor 40 may generate a second internal signal, to trigger the second digital signal processor 40 to perform a protection action to turn off the second controllable switch S2.

The second internal signal generated in the second digital signal processor 40 may be forwarded to the second output port 42 through the second output crossbar switch 41. Then, the first digital signal processor 30 can receive the second internal signal within a preset time through the first input port 33 connected to the second output port 42, thereby triggering a protection action of turning off the first controllable switch S1.

It should be noted that, FIG. 4 shows an example in which the first input port 32/the first output port 33 and the second input port 42/the second output port 43 are respectively two different ports in the digital signal processor. In some other embodiments, the first input port 32/the first output port 33 or the second input port 42/the second output port 43 may alternatively be one port, and is configured to perform functions of an input port and an output port in different time periods (for example, implemented by a general-purpose input/output interface).

One of the advantageous aspects of the electrical system provided in the embodiments of this application is that a low-latency bidirectional transmission path between the first digital signal processor and the second digital signal processor is established based on the output crossbar switch, so that a fault signal generated in the second digital signal processor may also be quickly transmitted to the first digital signal processor.

Figure 5:
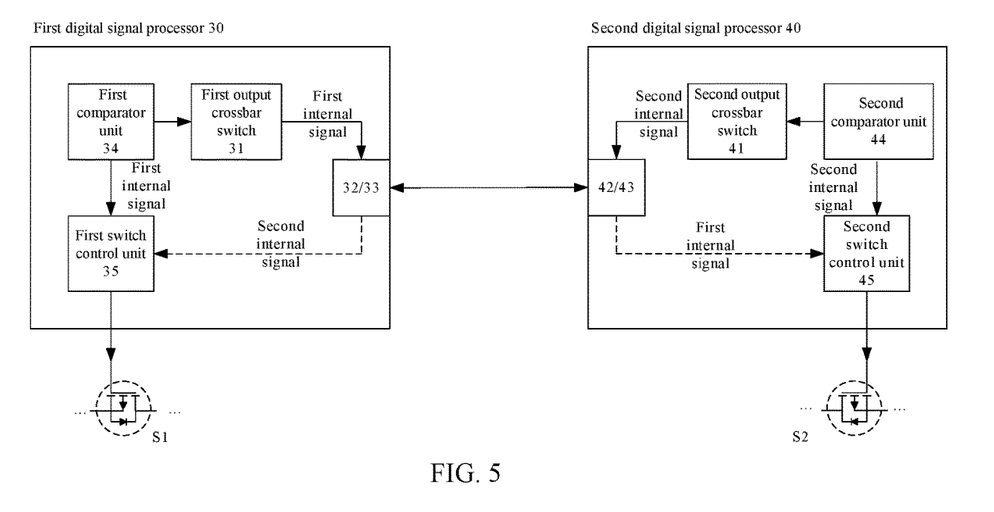
FIG. 5 is a schematic structural diagram of a digital signal processor according to some other embodiments of this application.

FIG. 5 shows a digital signal processor according to some other embodiments of this application. The first digital signal processor 30 may further include: a first output crossbar switch 31, a first comparator unit 34, and a first switch control unit 35.

The first comparator unit 34 is a function module built in the first digital signal processor 30 and configured to detect an operation situation of the first-stage conversion module 10 in real time. Specifically, a voltage signal or current signal of one or more sampling nodes in the first-stage conversion module 10 may be obtained by using any suitable sampling method, and based on this, whether the operation of the first-stage conversion module 10 is abnormal is determined.

In the embodiment of this application, "abnormal" refers to a case where a detected voltage or current signal deviates significantly from data in normal operation, which may threaten the operation and safety of devices. For example, the first comparator unit may determine whether a collected voltage signal or current signal is abnormal by determining whether the voltage signal or current signal exceeds a preset threshold.

The first switch control unit 35 is a control part, in the first digital signal processor 30, configured to control the first controllable switch S1 to be turned on or off. It may control the first controllable switch by outputting different control signals (such as high-level or low-level signals) to a control terminal of the first controllable switch S1.

In operation, the first comparator unit 34 may generate the first internal signal when the first comparator unit 34 detects that a voltage signal or current signal is abnormal (for example, the voltage signal exceeds a preset voltage threshold). In response to the first internal signal generated by the first comparator unit 34, the first switch control unit 35 performs a protection action to turn off the first controllable switch S1.

According to the first digital signal processor provided in the embodiments of this application, a built-in comparator unit completes detection of an operating status of the first-stage conversion module, and may generate the first internal signal and turn off the first controllable switch in a timely manner when an operating abnormality (for example, overvoltage or overcurrent) occurs.

According to some embodiments of this application, optionally, still referring to FIG. 5, the second digital signal processor 40 may further include: a second output crossbar switch 41, a second comparator unit 44, and a second switch control unit 45.

The second comparator unit 44 is a function module built in the second digital signal processor 40 and configured to detect an operating status of the second-stage conversion module 20 in real time. Specifically, a voltage signal or current signal of one or more sampling nodes in the second-stage conversion module 20 may be obtained by using any suitable sampling method, and based on this, whether the operation of the second-stage conversion module 20 is abnormal is determined.

In the embodiments of this application, "abnormal" refers to a case where a detected voltage or current signal deviates significantly from data in normal operation, which may threaten the operation and safety of devices. For example, an abnormality such as overvoltage or overcurrent occurs.

The second switch control unit 45 is a control part, in the second digital signal processor 40, configured to control the second controllable switch S2 to be turned on or off. It may control the second controllable switch by outputting different control signals (such as high-level or low-level signals) to a control terminal of the second controllable switch S2.

In operation, the second comparator unit 44 may generate the second internal signal when the second comparator unit 44 detects that a voltage signal or current signal is abnormal (for example, the voltage signal exceeds a preset voltage threshold). In response to the second internal signal generated by the second comparator unit 44, the second switch control unit 45 performs a protection action to turn off the second controllable switch S2.

According to the second digital signal processor provided in the embodiments of this application, a built-in comparator unit completes detection of an operating status of the second-stage conversion module, and may generate the second internal signal and turn off the second controllable switch in a timely manner when an operating abnormality (for example, overvoltage or overcurrent) occurs.

Figure 6:
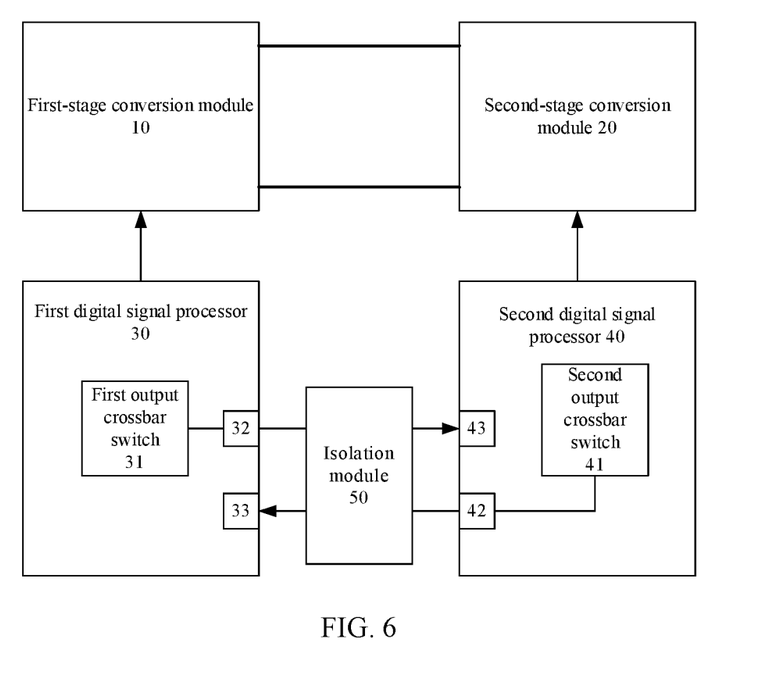
FIG. 6 is a schematic structural diagram showing an electrical system in which an isolation module is disposed between two digital signal processors according to some embodiments of this application.

According to some embodiments of this application, optionally, FIG. 6 shows an electrical system according to some other embodiments of this application. In addition to the function modules shown in FIG. 3, the electrical system may further include an isolation module 50.

The isolation module 50 is a component for implementing electrical isolation between the first stage and the second stage. It is disposed at a physical connection established between the first digital signal processor 30 and the second digital signal processor 40, to implement an electrical isolation effect.

For example, the second output port 42 of the second digital signal processor may be coupled to the first input interface 33 of the first digital signal processor through the isolation module 50. The first output port 32 of the first digital signal processor is also coupled to the second input port 43 of the second digital signal processor through the isolation module 50.

Specific implementations of the isolation module 50 may be determined according to actual requirements, as long as requirements of electrical isolation between the first digital signal processor belonging to the first stage and the second digital signal processor belonging to the second stage are met.

One of the advantageous aspects of the electrical system provided in the embodiments of this application is that an additional isolation module is disposed at a physical connection for transmitting signals between two digital signal processors, which may effectively reduce mutual interference between the first stage and the second stage.

It should be noted that the terms "first" and "second" in the above embodiments are only used to distinguish between electronic devices respectively belonging to the first stage and the second stage in the electrical system, and are not used to limit specific implementations of electronic devices or components. In the first stage and the second stage, electronic devices having a same name may use a same circuit or chip, or may be implemented in different manners according to actual requirements.

Figure 7:
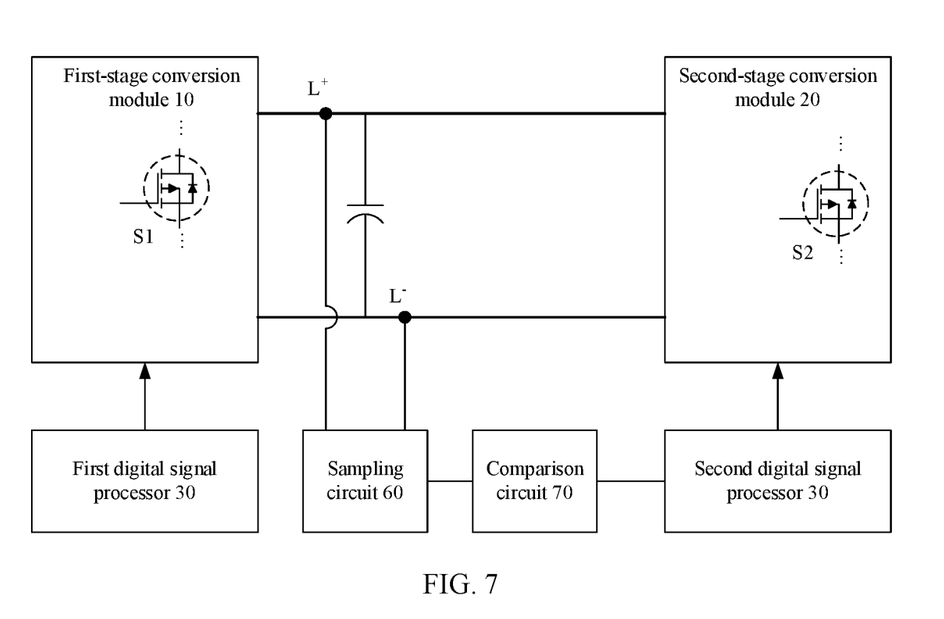
FIG. 7 is a schematic structural diagram of an electrical system according to some other embodiments of this application.

FIG. 7 shows an electrical system according to some other embodiments of this application. Referring to FIG. 7, the electrical system includes: a first-stage conversion module 10, a second-stage conversion module 20, a first digital signal processor 30, a second digital signal processor 40, a sampling circuit 60, and a comparison circuit 70.

The first-stage conversion module 10 includes a plurality of first controllable switches S1. The turn-on and turn-off of these first controllable switches S1 are controlled by the first digital signal processor 30 in order according to a set control program. The second-stage conversion module 20 also includes a plurality of second controllable switches S2. The turn-on and turn-off of these second controllable switches S2 are controlled by the additional second digital signal processor 40 in order according to a set control program.

The sampling circuit 60 is coupled to a connection of the first-stage conversion module 10 and the second-stage conversion module 20, and may collect an electrical signal (for example, a voltage signal or current signal) generated at the connection and provide the signal for the comparison circuit 70. The comparison circuit 70 is connected to the sampling circuit 60, and is configured to determine, based on data collected by the sampling circuit 60, whether the collected electrical signal is abnormal.

An abnormality occurring in an electrical signal at the foregoing connection (for example, a voltage or current exceeding a preset threshold) may be caused by a plurality of reasons. For example, when the first digital signal processor 30 has stopped working and the second digital signal processor 40 still operates, the second-stage conversion module is used as a load at the connection, resulting in a rapid decrease in a voltage across two terminals of the connection.

For convenience of description, circuit modules in the electrical system (for example, the foregoing sampling circuit and comparison circuit) are divided and described according to functions to be performed in the embodiment. Those skilled in the art can understand that these function modules may be implemented in different manners according to actual requirements, and may alternatively be integrated into one component or be further split into a plurality of sub-units, which is not limited to the examples of the function module division methods in the accompanying drawings in this specification.

In operation, the sampling circuit 60 collects an electrical signal at the connection and provides the electrical signal for the comparison circuit 70, and the comparison circuit 70 determines whether the collected electrical signal is abnormal.

When the collected electrical signal is normal, the comparison circuit 70 may continue to keep detecting without exerting an influence on the operation of the second digital signal processor. When the collected electrical signal is abnormal, the comparison circuit 70 provides a third signal for the second digital signal processor.

When receiving the third signal provided by the comparison circuit 70, the second digital signal processor 40 is triggered to perform a protection action to turn off the second controllable switch S2 to guarantee device safety. The third signal may be specifically implemented in a corresponding form according to actual requirements. For example, when an output terminal of the comparison circuit 70 is connected to an enable signal receiving terminal of the second digital signal processor 40, the third signal may be an enable signal for stopping the second digital signal processor 40 from working.

One of the advantageous aspects of the electrical system provided in the embodiments of this application is that, the sampling circuit and the comparison circuit are additionally disposed, so that the third signal may be generated when the first digital signal processor turns off the first controllable switch to cause an electrical signal at the connection to be abnormal, and the second digital signal processor can also turn off the second controllable switch synchronously within a relatively short time, thereby ensuring that the second-stage conversion module can quickly follow the action of the first-stage conversion module.

Figure 8:
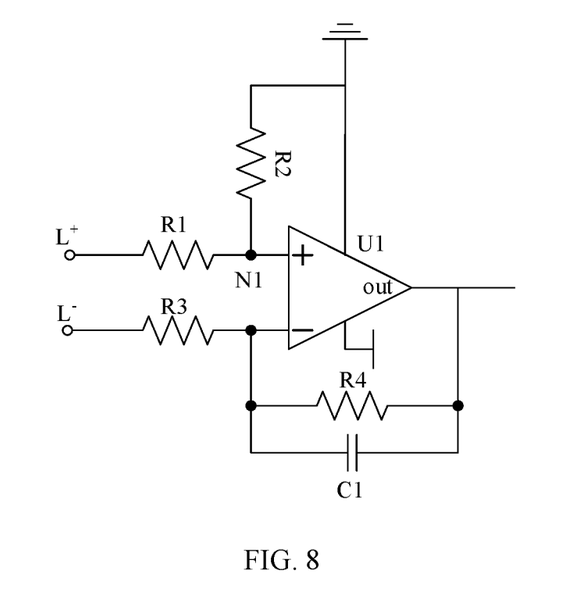
FIG. 8 is a schematic diagram of the principle of a sampling circuit according to some embodiments of this application.

According to some embodiments of this application, FIG. 8 is a sampling circuit 60 in some embodiments of this application. Referring to FIG. 8, optionally, the sampling circuit 60 may be a sampling circuit implemented based on a comparator.

The sampling circuit may include: a first comparator U1, a first resistor R1, a second resistor R2, a third resistor R3, a fourth resistor R4, and a first capacitor C1.

One terminal of the first resistor R1 is connected to a high-level terminal (L$^+$) of the connection, and the other terminal of the first resistor R1 is connected to one terminal of the second resistor R2 to form a first connection node N1.

The other terminal of the second resistor R2 is grounded, and the first connection node N1 is connected to a first input terminal (+) of the first comparator U1. One terminal of the third resistor R3 is connected to a low-level terminal (L$^-$) of the connection, and the other terminal of the third resistor R3 is connected to a second input terminal (−) of the first comparator U1.

One terminal of the fourth resistor R4 is connected to the second input terminal (−) of the first comparator U1, and the other terminal of the fourth resistor R4 is connected to an output terminal (out) of the first comparator U1, to form a negative feedback loop. One terminal of the first capacitor C1 is connected to the second input terminal (−) of the first comparator U1, and the other terminal of the first capacitor C1 is connected to an output terminal (out) of the first comparator U1.

The output terminal (out) of the first comparator U1 is connected to the comparison circuit, and configured to provide the comparison circuit with a voltage signal that is amplified or reduced in proportion to a voltage at the connection.

The sampling circuit provided in the embodiments of this application is implemented based on a comparator, so that a proportionally amplified voltage analog signal may be provided at the output terminal. In addition, a plurality of capacitors and a plurality of resistors are disposed, so that in an actual implementation process, a capacitance value of a capacitor and a resistance value of a resistor may be adjusted. In this way, the sampling circuit can stably output a suitable voltage analog signal at the output terminal.

Figure 9:
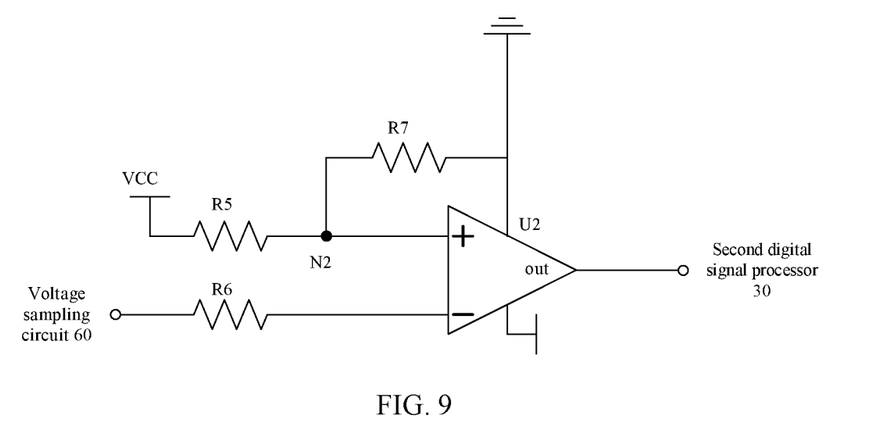
FIG. 9 is a schematic diagram of the principle of a comparison circuit according to some embodiments of this application.

According to some embodiments of this application, FIG. 9 shows a comparison circuit in some embodiments of this application. This comparison circuit may be used in conjunction with a sampling circuit that provides an analog signal, such as that shown in FIG. 8. Referring to FIG. 9, the comparison circuit 70 includes a reference voltage source VCC for providing a reference voltage and a second comparator U2.

A first input terminal (+) of the second comparator U2 is coupled to an output terminal of a voltage sampling circuit 60, to obtain a proportionally amplified voltage analog signal. A second input terminal (−) of the second comparator U2 is coupled to the reference voltage source VCC. An output terminal (out) of the second comparator U2, as an output terminal of the comparison circuit 70, is connected to the second digital signal processor 40.

In operation, a voltage at the output terminal of the voltage sampling circuit 60 may be lower than the reference voltage, or may be higher than the reference voltage provided by the reference voltage source VCC. Correspondingly, the second comparator may output different electrical signals based on a voltage comparison result of the first input terminal (+) and the second input terminal (−) of the second comparator.

When a voltage of the first input terminal (+) is less than that of the second input terminal (−), the comparison circuit 70 may output, at the output terminal, the third signal to the second digital signal processor 40, so that the second digital signal processor 40 immediately stops operating and turns off the second controllable switch. When the voltage of the first input terminal (+) is greater than that of the second input terminal (−), the comparison circuit 70 may output, at the output terminal, an electrical signal different from the third signal, so that the second digital signal processor 40 maintains a normal operating state.

The comparison circuit provided in the embodiments of this application is implemented based on the comparator, and a threshold of a voltage signal is designed by using the reference voltage source VCC. When a level between the two input terminals of the comparator changes, a corresponding electrical signal may be output at the output terminal, to ensure that the second digital signal processor can stop operating in time based on the electrical signal, thereby guaranteeing device safety.

According to some embodiments of this application, optionally, still referring to FIG. 9, in addition to the reference voltage source VCC and the second comparator U2, the comparison circuit 70 may further include a fifth resistor R5, a sixth resistor R6, and a seventh resistor R7.

One terminal of the fifth resistor R5 is connected to the reference voltage source VCC, the other terminal of the fifth resistor R5 is connected to one terminal of the seventh resistor R7, to form a second connection node N2. The other terminal of the seventh resistor R7 is grounded.

The second connection node N2 is connected to a first input terminal (+) of the second comparator U2. One terminal of the sixth resistor R6 is connected to the output terminal of the voltage sampling circuit 60, and the other terminal of the sixth resistor R6 is connected to the second input terminal (−) of the second comparator U2. The comparison circuit provided in the embodiments of this application is further provided with a plurality of resistors. Therefore, the comparison circuit may meet actual use requirements by adjusting resistance values of the resistors (for example, adjusting resistance ratios of the fifth resistor and the seventh resistor to flexibly change a voltage threshold of the comparison circuit).

According to some embodiments of this application, optionally, the comparison circuit 70 may be additionally provided with a suitable logic device to meet the actual requirements. For example, when the voltage of the first input terminal (+) of the second comparator U2 is less than that of the second input terminal (−), a level output by the output terminal of the second comparator U2 is a high-level signal. However, the second digital signal processor 40 is designed as follows: when the second digital signal processor 40 can only stop operating by providing a low-level enable signal, a NOT gate circuit may be additionally disposed between the output terminal of the comparison circuit 70 and the second digital signal processor, to convert a high-level signal to a low-level signal, so that the second digital signal processor 40 can stop operating when the voltage at the first input terminal (+) is less than that at the second input terminal (−). Such a design can flexibly meet requirements of different actual scenarios.

Figure 10:
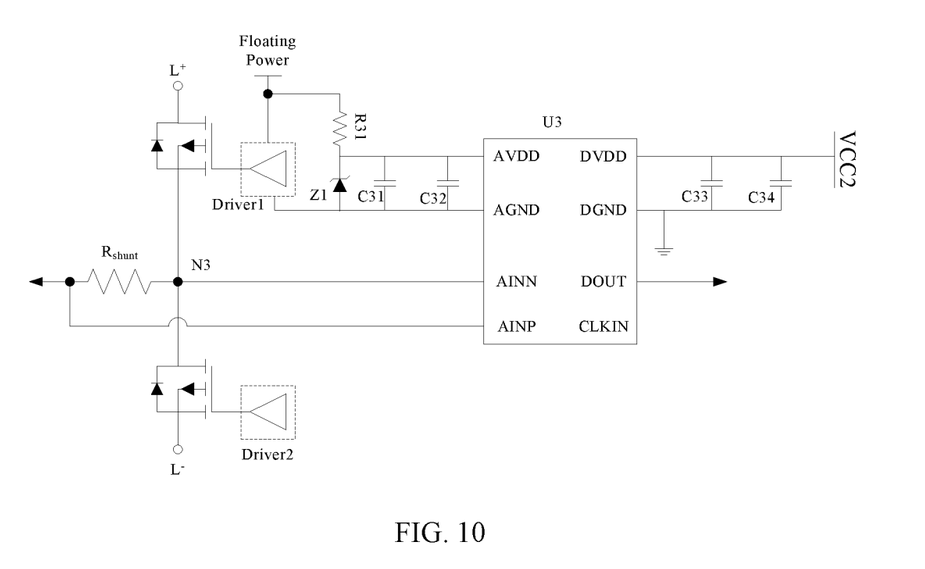
FIG. 10 is a schematic diagram of the principle of a sampling circuit using SDFM sampling according to some other embodiments of this application.

According to some embodiments of this application, FIG. 10 shows a sampling circuit in another embodiment of this application. Referring to FIG. 10, the sampling circuit may be a sampling circuit using SDFM (Sigma-Delta Filter Module) sampling. Such a sampling circuit can directly provide a processor with a sampling result in a form of digital signals, and is applicable to a scenario in which a digital signal is used.

According to some embodiments of this application, optionally, still referring to FIG. 10, the sampling circuit may include: a shunt $R_{shunt}$ and an isolated signal modulator U3.

The shunt $R_{shunt}$ is connected in series with a load, so that an analog signal corresponding to electrical signal changes that occur at a connection may be generated. Both terminals of the shunt $R_{shunt}$ are connected to an analog side of the isolated signal modulator U3, and the analog signal is input.

The isolated signal modulator U3 is a modulator used to convert an analog input signal into a high-speed digital bit stream consisting of 0s and 1s, while isolating an input circuit from an output circuit by using an isolating layer. For convenience of description, in this embodiment, the part of the isolated signal modulator U3 for receiving an analog signal is called an "analog side", and the part for outputting a digital signal is called a "digital side".

In operation, a voltage drop that changes with a voltage signal at the connection is formed at both terminals of the shunt $R_{shunt}$, and is supplied as an analog input signal to the isolated signal modulator U3. The isolated signal modulator U3 may output a converted digital bit stream on the digital side. The output digital bit stream is provided to a corresponding functional unit of the processor for subsequent processing such as SDFM digital filtering. Such a design uses an isolated signal modulator to convert the analog signal, to implement an electrical isolation effect.

According to some embodiments of this application, optionally, still referring to FIG. 10, the sampling circuit specifically includes: a first switching transistor Q31, a second switching transistor Q32, a first drive unit Driver1 for driving the first switching transistor Q31, a second drive unit Driver2 for driving the second switching transistor Q32, a floating power Floating Power, a DC voltage source VCC2, an eighth resistor R31, a Zener diode Z1, a second capacitor C31, a third capacitor C32, a fourth capacitor C33, and a fifth capacitor C34.

A source terminal of the first switching transistor Q31 is connected to one terminal of the shunt $R_{shunt}$ to form a third connection node N3. A drain terminal of the first switching transistor Q31 is connected to a high-level terminal of the connection. The first drive unit Driver1 is connected to a gate of the first switching transistor Q31.

A source terminal of the second switching transistor Q32 is connected to the third connection node N3, and a drain terminal of the second switching transistor Q33 is connected to a low-level terminal of the connection. The second drive unit Driver2 is connected to a gate of the second switching transistor Q32.

The isolated signal modulator U3 includes AINN and AINP ports for receiving an analog signal, an AVDD port for receiving analog side voltage, an AGND port for analog side grounding, a DVDD port for receiving digital side voltage, a DGND port for digital side grounding, a DOUT port for outputting a digital bit stream, and a CLKIN port for receiving/providing a clock signal.

Both terminals of the shunt $R_{shunt}$ are connected to the AINN and AINP ports of the isolated signal modulator U3, respectively, to provide a voltage drop change signal formed across two terminals of the shunt. The DOUT port of the isolated signal modulator U3 outputs a corresponding digital bit stream for subsequent processing such as digital filtering. The CLKIN of the isolated signal modulator U3 is configured to provide/receive a clock signal.

The floating power Floating Power, the eighth resistor R31, the Zener diode Z1, the second capacitor C31, and the third capacitor C32 constitute a part for supplying power on the analog side of the isolated signal modulator U3. In addition, the floating power Floating Power also supplies power to the first drive unit Driver1 and the second drive unit Driver2.

A cathode of the Zener diode Z1, one terminal of the second capacitor C31, and one terminal of the third capacitor C32 are connected to the AGND port of the isolated signal modulator U3. An anode of the Zener diode Z1, the other terminal of the second capacitor C31, the other terminal of the third capacitor C32, and the AVDD port of the isolated signal modulator U3 are all connected to one terminal of the eighth resistor R31, and the other terminal of the eighth resistor R31 is connected to the floating power Floating Power.

The DC voltage source VCC2 (such as 3.3 V or 5 V voltage), the fourth capacitor C33, and the fifth capacitor C34 constitute a part for supplying power on the digital side of the isolated signal modulator U3. The DC voltage source VCC2, one terminal of the fourth capacitor C33, and one terminal of the fifth capacitor C34 are connected to the DVDD port of the isolated signal modulator U3. The other terminal of the fourth capacitor C33, the other terminal of the fifth capacitor C34, and the DGND port of the isolated signal modulator U3 are grounded.

Based on such a design, electrical signals at the connection are collected by turning on and off two controllable switching transistors in order.

Figure 11:
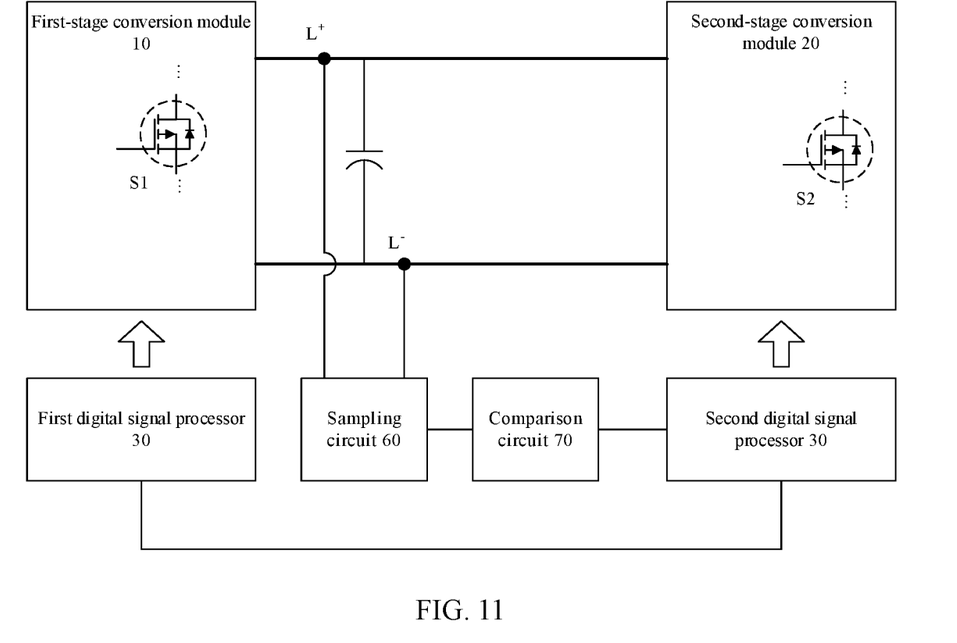
FIG. 11 is a schematic structural diagram showing an electrical system in which there are two low-latency paths between two digital signal processors according to some other embodiments of this application.

According to some embodiments of this application, FIG. 11 shows an electrical system in some other embodiments of this application. Referring to FIG. 11, for the electrical system, a physical connection is disposed between a first digital signal processor and a second digital signal processor, so that mutual fault signal transmission may be implemented based on an output crossbar switch. In addition, a sampling circuit 60 and a comparison circuit 70 that are configured to detect electrical signals generated at a connection of a first-stage conversion module and a second-stage conversion module are disposed.

In operation, when the first digital signal processor triggers a protection action and the first-stage conversion module stops operating, a first internal signal generated by the first digital signal processor may be transmitted to the second digital signal processor through the physical connection, so that the second-stage conversion module can quickly stop operating.

In addition, the sampling circuit 60 and the comparison circuit 70 can detect the electrical signal generated at the connection of the first-stage conversion module and the second-stage conversion module. The comparison circuit 70 may provide an operation stop signal for the second digital signal processor within a short time when the first-stage conversion module stops operating, so that the second-stage conversion module can follow the first-stage conversion module and stop operating in time.

One of the advantageous aspects of the electrical system provided in the embodiments of this application is that two low-latency implementations with different implementation principles may serve as a backup and redundant path for each other. Even if one of the low-latency implementations fails, it may be ensured that the second-stage conversion module can cooperate with the first-stage conversion module, thereby improving reliability of the electrical system.

Those skilled in the art can understand that, provided that there is no contradiction between the technical solutions provided in some embodiments of this application, these technical solutions may also be combined arbitrarily to form other more embodiments. For example, the comparison circuit shown in FIG. 9 may be used in the electrical system shown in FIG. 11.

Figure 12:
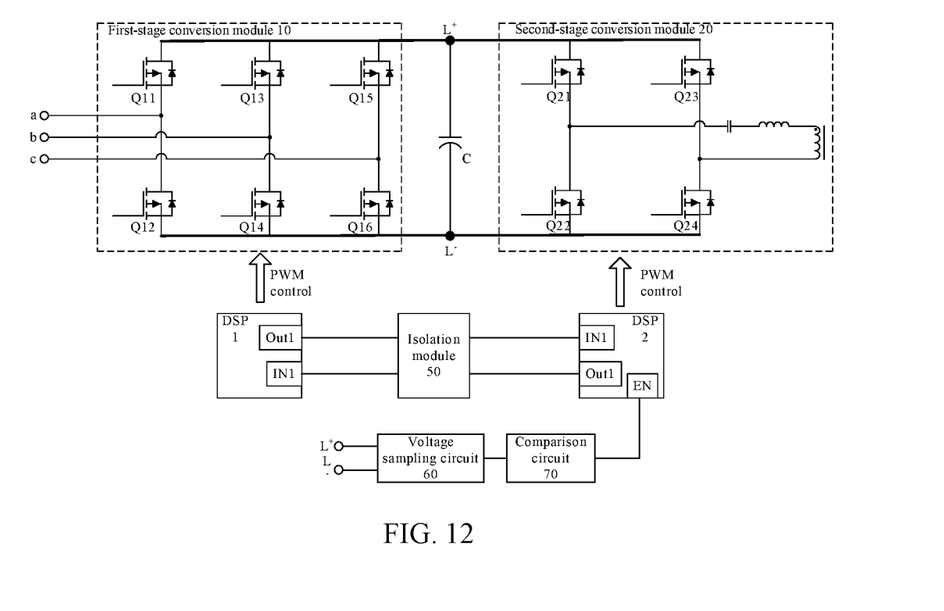
FIG. 12 is a schematic structural diagram showing an electrical system in which a PFC circuit is cascaded with an LLC circuit according to some embodiments of this application.

According to some embodiments of this application, FIG. 12 shows an electrical system in which a PFC circuit is cascaded with an LLC circuit. Referring to FIG. 12, a first-stage conversion module 10 is a PFC circuit, which is connected to the power grid to draw power. A second-stage conversion module 20 is an LLC circuit (the primary side part of a transformer of the LLC circuit shown in FIG. 12 is merely used as an example), and may output a target voltage or current required by a load. The first-stage conversion module 10 and the second-stage conversion module 20 are controlled by a first digital signal processor DSP1 and a second digital signal processor DSP2, respectively.

The first-stage conversion module 10 includes six first controllable switching transistors, which are respectively represented by Q11, Q12, Q13, Q14, Q15, and Q16 in FIG. 12. The primary side part of the LLC circuit includes four second controllable switching transistors, which are respectively represented by Q21, Q22, Q23, and Q24 in FIG. 12.

One port of the first digital signal processor DSP1, serving as a first output port Out1, may be connected to a second input port IN2 of a second digital signal processor DSP2 through an isolation module 50.

One port of the second digital signal processor DSP2, also serving as a second output port Out2, may be connected to a first input port IN1 of the first digital signal processor DSP1 through the isolation module 50. The input and output ports may be general-purpose input/output interfaces (GPIOs) in a digital signal processor.

In operation, an abnormal signal detected by a comparator unit inside the first digital signal processor DSP1 may be forwarded, through an output crossbar switch (X-bar output), to the first output port Out1 for output; and then supplied to the second digital signal processor DSP2 through the second input port IN2, so that the second digital signal processor DSP2 can also stop operating of the LLC circuit in time.

It can be learned from the foregoing operation process that a time interval for triggering a protection action between the first digital signal processor DSP1 and the second digital signal processor DSP2 mainly depends on a time latency of the comparator unit inside the digital signal processor, and the time latency may be well controlled within 5 us.

It should be noted that a physical connection established between the first digital signal processor DSP1 and the second digital signal processor DSP2 through the output crossbar switch (X-bar output) may also be used to transmit another fault signal, and is not limited to the fault signal generated by the internally disposed comparator unit exemplarily described in the embodiments of this application.

Still referring to FIG. 12, the electrical system further includes a voltage sampling circuit 60 and a comparison circuit 70.

The voltage sampling circuit 60 is connected to two terminals of a bus capacitor C for detecting a voltage across the two terminals of the bus capacitor C. The comparison circuit 70 is connected to an enable control terminal EN of the second digital signal processor DSP2 and the voltage sampling circuit 60, and configured to provide a corresponding enable signal for the second digital signal processor DSP2 based on a result of comparison between a voltage signal and a reference voltage.

In operation, the voltage sampling circuit 60 outputs a voltage signal that is proportionally amplified based on the voltage across the two terminals of the bus capacitor C to the comparison circuit 70.

The comparison circuit 70 detects whether the voltage signal is less than the reference voltage. If the detected voltage signal is greater than the reference voltage, it indicates that the voltage across the two terminals of the bus capacitor C is normal. In this case, a first enable signal (for example, a high-level signal) is provided for the second digital signal processor, and the second digital signal processor DSP2 is in a normal operating state.

Once it is detected that the voltage signal is lower than the reference voltage, it indicates that the voltage across the two terminals of the bus capacitor C is too low, and a first controllable switch of a PFC circuit has a very high risk of short circuit. In this case, a second enable signal (for example, a low-level signal) is provided for the second digital signal processor, so that the second digital signal processor DSP2 immediately stops operating of the LLC circuit.

It can be learned from the foregoing operation process that a time interval for triggering a protection action between the first digital signal processor DSP1 and the second digital signal processor DSP2 mainly depends on a time latency of the voltage sampling circuit and the comparison circuit, and the time latency may be well controlled within 10 us. In some embodiments, a suitable voltage sampling circuit and a suitable comparison circuit may alternatively be used, so that the time latency is further controlled within 3 us.

According to the electrical system provided in some embodiments of this application, when the first digital signal processor DSP1 triggers protection and the PFC circuit stops operating, two different methods are provided to ensure that the second digital signal processor DSP2 can also control, within a relatively short time (such as 5 us), the LLC circuit to stop operating, to avoid short circuit and damage to a switching transistor caused when the voltage across the two terminals of the bus capacitor C is lower than a peak voltage of the power grid. The foregoing two protection methods based on hardware circuit and software configuration may provide better redundancy to ensure that no short circuit occurs on a switching transistor during operation of the electrical system.

Finally, it should be noted that, the foregoing embodiments are merely used to describe the technical solutions of this application, but are not limited thereto. Although this application is described in detail with reference to the foregoing embodiments, persons of ordinary skill in the art should understand that they may still make modifications to the technical solutions described in the foregoing embodiments or make equivalent replacements to some or all technical features thereof; and these modifications or replacements do not make the essence of the corresponding technical solution depart from the scope of the technical solutions of the embodiments of this application, and shall fall within the scope of the claims and specification of this application. In particular, as long as there is no structural conflict, various technical features mentioned in each embodiment can be combined in any manner. This application is not limited to the specific embodiments disclosed herein, but includes all technical solutions falling within the scope of the claims.

What is claimed is:

1. An electrical system, comprising:
a first-stage conversion module, wherein the first-stage conversion module comprises a first controllable switch;
a second-stage conversion module, wherein the second-stage conversion module is coupled to the first-stage conversion module and comprises a second controllable switch;
a first digital signal processor, wherein the first digital signal processor is configured to control the first controllable switch, and comprises a first output crossbar switch, a first output port and a first input port; and
a second digital signal processor, wherein the second digital signal processor is configured to control the second controllable switch, and comprises a second output crossbar switch, a second output port and a second input port;
wherein
the first digital signal processor and the second digital signal processor are connected by wirings;
the first output crossbar switch is a single-directional switch configured to conduct a first internal signal to the first output port, so that the second digital signal processor receives the first internal signal via the second input port within a preset time;
the second output crossbar switch is a single-directional switch configured to conduct a second internal signal to the second output port, so that the first digital signal processor receives the second internal signal via the first input port within the preset time; and
the electrical system further comprises an isolation module configured to provide an electrical isolation between the first digital processor and the second digital signal processor, the first output port of the first digital signal processor is connected to the second input port of the second digital signal processor via the isolation module, and the first input port of the first digital signal processor is connected to the second output port of the second digital signal processor via the isolation module.

2. The electrical system according to claim 1, wherein
the first internal signal is a fault signal generated in the first digital signal processor and used to trigger the first digital signal processor to turn off the first controllable switch and trigger the second digital signal processor to turn off the second controllable switch; and
the second internal signal is a fault signal generated in the second digital signal processor and is used to trigger the first digital signal processor to turn off the first controllable switch and trigger the second digital signal processor to turn off the second controllable switch.

3. The electrical system according to claim 1, wherein the first digital signal processor further comprises:
a first comparator unit configured to detect a voltage signal or current signal in the first-stage conversion module in real time; and
a first switch control unit configured to control the first controllable switch, wherein the first comparator unit is configured to:
when the voltage signal or current signal in the first-stage conversion module is abnormal, generate the first internal signal; and
the first switch control unit is configured to:
in response to the first internal signal, turn off the first controllable switch.

4. The electrical system according to claim 1, wherein the second digital signal processor further comprises:
a second comparator unit configured to detect a voltage signal or current signal in the second-stage conversion module in real time; and
a second switch control unit configured to control the second controllable switch, wherein the second comparator unit is configured to:
when the voltage signal or current signal in the second-stage conversion module is abnormal, generate the second internal signal; and
the second switch control unit is configured to:
in response to the second internal signal, turn off the second controllable switch.

5. The electrical system according to claim 1, wherein the electrical system further comprises:
a sampling circuit coupled to a connection of the first-stage conversion module and the second-stage conversion module, wherein the sampling circuit is configured to collect an electrical signal at the connection; and
a comparison circuit coupled to the sampling circuit, wherein the comparison circuit is configured to:
when the electrical signal is abnormal, provide a third signal for the second digital signal processor,
wherein the second digital signal processor is further configured to:
in response to the third signal, turn off the second controllable switch.

6. The electrical system according to claim 5, wherein the sampling circuit comprises:
a first comparator, a first resistor, a second resistor, a third resistor, a fourth resistor, and a first capacitor,
wherein
one terminal of the first resistor is connected to a high-level terminal of the connection, another terminal of the first resistor is connected to one terminal of the second resistor to form a first connection node,
another terminal of the second resistor is grounded, and the first connection node is connected to a first input terminal of the first comparator;
one terminal of the third resistor is connected to a low-level terminal of the connection, and another terminal of the third resistor is connected to a second input terminal of the first comparator;
one terminal of the fourth resistor is connected to the second input terminal of the first comparator, and another terminal of the fourth resistor is connected to an output terminal of the first comparator to form a negative feedback path;
one terminal of the first capacitor is connected to the second input terminal of the first comparator, and another terminal of the first capacitor is connected to the output terminal of the first comparator; and
the output terminal of the first comparator is further coupled to the comparison circuit, to form an output terminal of the sampling circuit for providing a voltage signal that is proportional to a voltage at the connection.

7. The electrical system according to claim 5, wherein the comparison circuit comprises a reference voltage source for providing a reference voltage and a second comparator;

a first input terminal of the second comparator is coupled to an output terminal of the voltage sampling circuit, and a second input terminal of the second comparator is coupled to the reference voltage source; and an output terminal of the second comparator is connected to the second digital signal processor, and the second comparator is configured to: when a voltage at the output terminal of the sampling circuit is lower than the reference voltage, output the third signal to the second digital signal processor.

8. The electrical system according to claim 7, wherein the comparison circuit further comprises:

a fifth resistor, a sixth resistor, a seventh resistor, wherein one terminal of the fifth resistor is connected to the reference voltage source, another terminal of the fifth resistor is connected to one terminal of the seventh resistor to form a second connection node, another terminal of the seventh resistor is grounded, and the second connection node is connected to the second input terminal of the second comparator; and one terminal of the sixth resistor is connected to the output terminal of the voltage sampling circuit, and another terminal of the sixth resistor is connected to the first input terminal of the second comparator.

9. An electrical apparatus, comprising the electrical system according to claim 1 and a load coupled to the electrical system, wherein the electrical system is configured to draw and convert external power to supply power to the load.

* * * * *